United States Patent [19]
Kawamura

[11] Patent Number: 5,080,158
[45] Date of Patent: * Jan. 14, 1992

[54] BEAD REINFORCEMENT FOR A RADIAL TIRE FOR HEAVY DUTY

[75] Inventor: Kazuhiko Kawamura, Shirakawa, Japan

[73] Assignee: Sumitomo Rubber Industries, Ltd., Japan

[*] Notice: The portion of the term of this patent subsequent to Oct. 13, 2004 has been disclaimed.

[21] Appl. No.: 158,095

[22] Filed: Feb. 16, 1988

Related U.S. Application Data

[63] Continuation of Ser. No. 864,842, May 20, 1986, abandoned.

[30] Foreign Application Priority Data

May 21, 1985 [JP] Japan .................. 60-109972

[51] Int. Cl.$^5$ .................................... B60C 15/06
[52] U.S. Cl. .................. 152/541; 152/543; 152/546; 152/547; 152/554
[58] Field of Search ............ 152/539, 541, 543, 546, 152/547, 554, 555, 560, 454, 548

[56] References Cited

U.S. PATENT DOCUMENTS

| | | | |
|---|---|---|---|
| 2,155,564 | 4/1939 | Schippel | 152/543 X |
| 3,964,533 | 6/1976 | Arimura et al. | 152/547 X |
| 4,215,737 | 8/1980 | Motomura et al. | 152/547 X |
| 4,699,194 | 10/1987 | Iuchi | 152/554 X |

FOREIGN PATENT DOCUMENTS

| | | | |
|---|---|---|---|
| 0106805 | 8/1980 | Japan | 152/543 |
| 56608 | 4/1985 | Japan . | |
| 61316 | 4/1985 | Japan . | |

*Primary Examiner*—Michael W. Ball
*Assistant Examiner*—Geoffrey L. Knable
*Attorney, Agent, or Firm*—Stevens, Davis, Miller & Mosher

[57] ABSTRACT

The invention relates to a pneumatic radial tire for heavy duty vehicles such as trucks, buses etc., having an improved reinforced structure of bead section, which can be effectively improved in the durability under very heavy load conditions and can be recapped two or three times without damaging the base tire.

The radial tire for heavy duty, comprises: a carcass ply (2) of a radial or a semi-radial construction composed of at least one rubberized metal cord ply; a first metallic cord reinforcing layer (4) disposed at the outside of the turned up portion (2') of the carcass ply (2); and a second fiber cord reinforcing layer (6) secured to the inner surface of the carcass ply main portion.

The radially inner portion of the second reinforcing layer (6) is interposed by a given width (L) between the turned up portion (4') of the first reinforcing layer (4) and the main portion of the carcass ply in bead base portion.

The height (h1) of the radially outermost end (2a) of the turned up portion (2') of the carcass ply (2) is higher than the height (h2) of the radially outermost end (4a) of the first reinforcing layer (4).

8 Claims, 3 Drawing Sheets

BEAD REINFORCEMENT FOR A RADIAL TIRE FOR HEAVY DUTY

This application is a continuation, of application Ser. No. 864,842, filed May 20, 1986, now abandoned.

BACKGROUND OF THE INVENTION

1. Field of the Invention

The present invention relates to a radial tire for heavy duty, more particularly to an improvement of the structure for reinforcing bead sections of heavy duty radial tires.

2. Description of the Prior Art

In general, as shown in FIG. 1, a tire of this type comprises: a single ply carcass 102 arranged radially or semi-radially at a small angle of 15° to 30° with respect to the equatorial line of the tire; a hard rubber stock 111 and a soft rubber stock 112 each disposed above a bead core 103 between the main portion and turned up portion 102' of the carcass ply 102 and having JIS hardness greater than 80° and of about 50° to 65°, respectively; a reinforcing layer 104 composed of at least one rubberized ply containing metal cords embedded therein and disposed at the outside of the turned up portion 102'.

As another one example of the prior art, Japanese patent No. 967452 is well known to be one of excellent structure for reinforcing bead section. This patent, as shown in FIG. 2, is characterized in that a fiber cord reinforcing layers 206 composed of two or more layers having rubberized organic fiber cords and crossed with each other are arranged at the outside of the above mentioned metal cord first reinforcing layer 204 and extend radially upwardly from the bead base to the side wall region.

In this way, the radial or semi-radial tire has a single ply carcass composed of radially directed cords. As a result, the side wall of the tire is extremely soft, and its flexure in the axial direction of the tire is very large.

Therefore, the amount of deformation of the radial or semi-radial tire during one rotation is far larger than that of a bias tire. That is, the bead section of the tire is strongly forced to deform like a convex surface and overhang the rim flange under the influence of such soft side walls, contributing to their temperature increase.

It has been found by the inventors that the internal temperature of the bead section may increase up to 120° C. to 170° C. due to the above mentioned temperature increase and the heat transmission from the brake drum of vehicles. Thus, the bead sections suffer from dynamic fatigue and also thermal fatigue.

Furthermore, the adhesion of rubber with metallic cords or fiber cords, which is vital to maintain the tire performance, is largely detrimentally influenced by the dynamic and thermal fatigue when the internal temperature of the tire increased.

On the other hand, in these types of radial tires, the worn tire can be repeatedly used twice or thrice by recapping, and this recapping is regarded as a sales point for steel radial tires.

This recappability depends on the durability of the bead section at present. However, the above mentioned tire of the prior art do not always satisfy the requirement of such durability.

Recently, some drivers have begun to use such tires under more severe service conditions, namely, long and high-speed running under heavy load and high inflation pressure.

Accordingly, further improvement of the durability of the bead sections is strongly required.

When the tire having the bead section shown in FIG. 2 is inflated, the strain action in the bead section is illustrated as FIG. 3. That is, the carcass ply 202 turned up around the bead core 203 moves upwardly as shown by an arrow 21. The outermost end 202a of the turned-up portion 202' moves downwardly as shown by an arrow 23. As a result, the turned up portion 202' causes the reinforcing layer 204 and 206 to move downwardly as shown by an arrow 22, with rotating the bead core 203 as shown by an arrow 24.

When the adhesion among these layers is unable to endure the imposed strain, the carcass ply 202 pulls out from the bead core 203, this phenomenon will hereinafter be referred as "blow out".

This blow out phenomenon is apt to occur acceleratively by the above mentioned internal temperature raise, and the higher the temperature, the earlier it occurs.

Next, to consider the dynamic strain caused by the tire revolution under heavy load, the grounding area of the tire is most subjected to deformation, and the radially inner portion of the side wall strongly forced to deform like a convex surface and overhang the rim flange under the influence of such soft side walls. Therefore, the cord space between the adjacent steel cords is expanded by the deformation at the radially outer portion of the bead section, and in company with such movement of the carcass cord, the turned up portion 202' and the metal cord reinforcing layer 204 are forced to move toward the outside of the axial direction of the tire, as the result, the outermost end 202a of the turned up portion 202' and the outermost end 204a of the steel cord reinforcing layer 204 are more subjected to stress concentration, which leads to the separation in the bead sections.

With respect to the above mentioned internal temperature and strain in the bead section, various investigations were made, and the following facts were found: in a structure having the fiber cord reinforcing layers 206 arranged outside the above mentioned metal cord reinforcing layer 204 (See FIG. 2) as proposed in Japanese Patent No. 967452, the bead section is made thick, and more heat is generated under heavy load, and the strain in the bead section more increased.

As a result, the cord end of the fiber cord reinforcing layer 206 is apt to be the nucleus of causing separation due to stress concentration of the cord ends of the carcass ply 202 and the metallic cord reinforcing layer 204. And sometime the organic fiber cords in the fiber cord reinforcing layers 206 are broken, depending on the angle at which the fiber cord reinforcing layer (206) is arranged. And also the cut ends are apt to become the nucleus of causing separation in the bead section, when the tire undergo large lateral deflection.

BRIEF SUMMARY OF INVENTION

Against this background, an object of this invention is to provide a highly durable reinforced construction of the bead portions for large size radial tires for trucks or other heavy vehicles, which can effectively avoid the difficult problem which has been encountered with the above mentioned prior art techniques, that is, which are a resistant to use under very heavy load conditions and the recappability of two or three times without damaging the base tire.

This is practiced by means of decreasing the number of the reinforcing members causing the separation at the outside of the bead core as far as possible, to decrease the heat generation at the bead section as far as possible, to give full reinforcing effect to the bead section, and to increase the durability of the bead section under the particularly severe service conditions, whereby the tire can be reused by recapping with a new tread.

DETAILED DESCRIPTION

The description will be now directed to an embodiment of the present invention with reference to the drawings.

Figure 4:
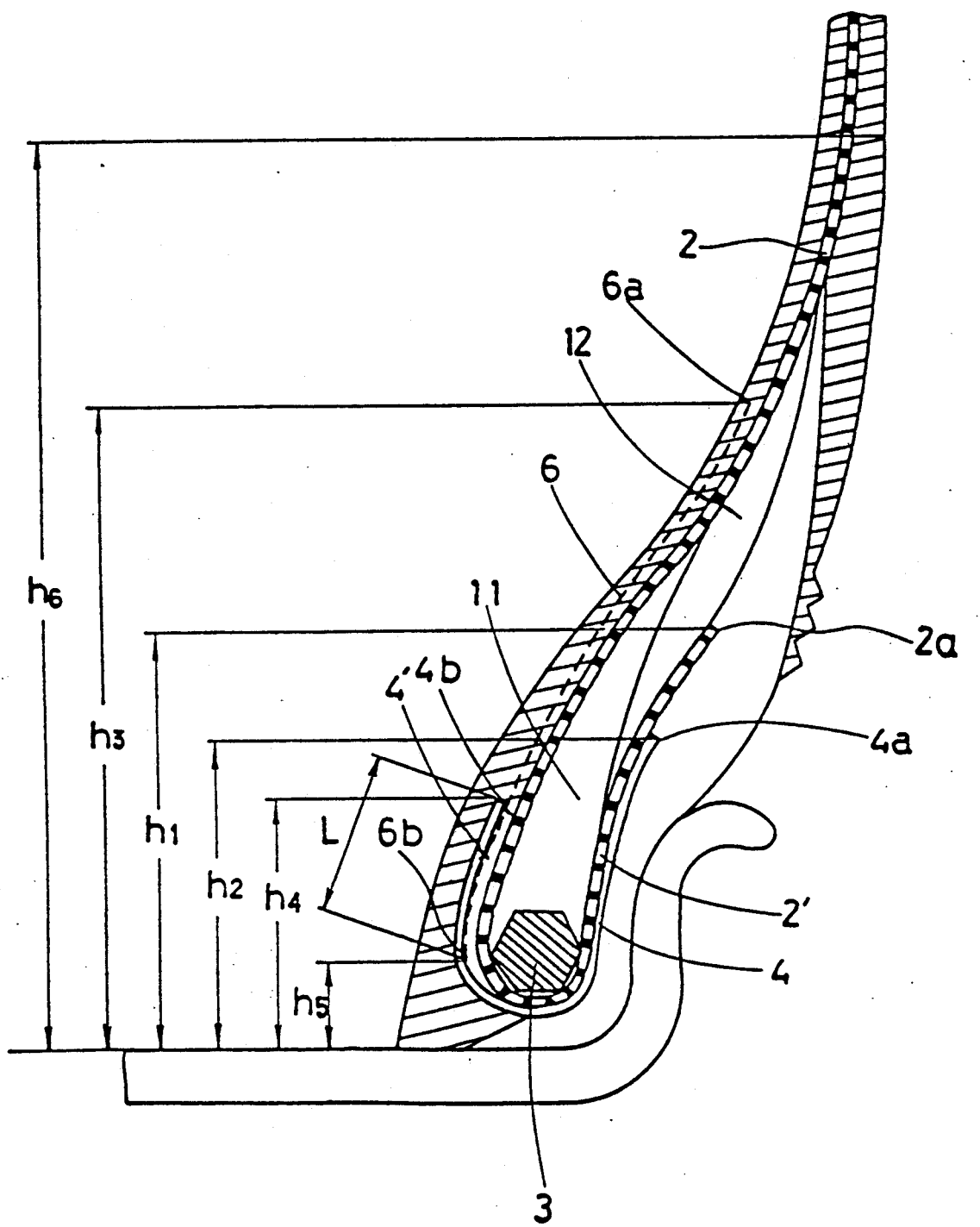
FIG. 4 is a cross-sectional view showing a bead portion of an embodiment of the present invention.

In FIG. 4, a radial tire for heavy duty comprising: a carcass ply 2 folded back around a bead core 3 from the axial inner to the axial outer side of the tire; a first reinforcing layer 4 composed of at least one metallic cord layer having metallic cords and arranged radially adjacent to and along the outerside of the turned up portion 2' of the carcass ply 2; and a second reinforcing layer 6 composed of at least one rubberized fiber cord layer secured to the inside of the main portion of the carcass ply 2 with respect to the tire axial direction and overlapping by a given width L with the inward turned up portion 4' of the first reinforcing layer 4.

The cords of the rubberized fiber cord layer are crossed with each other in their rubber coating surface.

The height h1 of the outermost end 2$a$ of the turned up portion 2' of the carcass ply 2 from the bead base is higher than the height h2 of the outermost end 4$a$ of the first reinforcing layer 4 from the bead base, that is, h1>h2.

The first reinforcing layer 4 is turned up around the bead core 3, and its inward turned up portion 4' terminates at the position of the height h4 from the bead base.

The above mentioned second reinforcing layer 6 is arranged along the inside of the carcass ply 2 and extends radially inwardly from the portion of height h3 to the bead base portion of height h5 each from the bead base.

The innermost end 6$b$, with respect to the radial direction, of the second reinforcing layer 6 must be extended to the position where the innermost end 6$b$ itself is interposed between the inward turned up portion 4' of the first reinforcing layer 4 and the main portion of the carcass ply 2 in the bead portion with a given width L. And the relation of h3>h4 must be satisfied.

It is preferable that the height h1 of the outermost end 2$a$ is 0.3 to 0.5 times as high as the height h6. In the position of the height h6, the tire section width is maximum,—when the tire is inflated.

When the height h1 is less than 0.3 h6, the rigidity of the bead section is lower, and a resistance to wear of the bead section also becomes lower due to the friction with the rim, and there is a risk for the carcass ply 2 to slip out of the bead core 3 because the turned up portion 2' is short and the bonding area with other components is also deficient.

On the contrary, when the height h1 is more than 0.5 h6, the outermost end 2$a$ extends up to near the position at which the flexure is most severe, so the nucleus of crack generates at the outermost end 2$a$, where the difference of rigidity is largest in the bead section under load. And the outermost end 2$a$ is liable to be strongly subjected to separation failure.

Accordingly, the height h1 of the outermost end 2$a$ of the turned up portion 2' is preferred to be 0.3 to 0.5 times as high as the height h6. This fact is confirmed by measuring of the resistance to the "blow out" phenomenon and the strain of the cord ends.

At the same time, it is preferable that the height h2 of the outermost end 4$a$ is 0.7 to 0.9 times as high as the height h1 of the outermost end 2$a$ of the turned up portion 2'.

Figure 1:
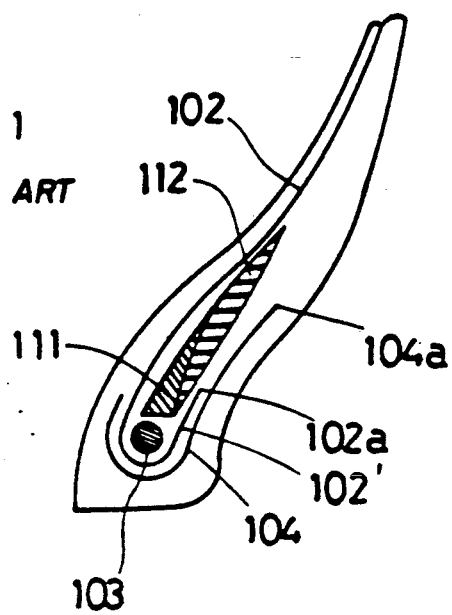
FIGS. 1 and 2 are cross-sectional views showing a bead section of the prior art tire.
Figure 2:
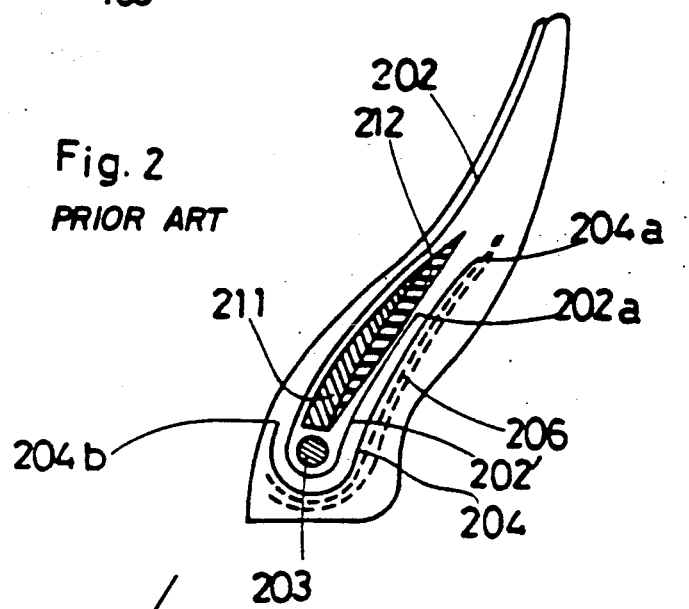
Figure 3:
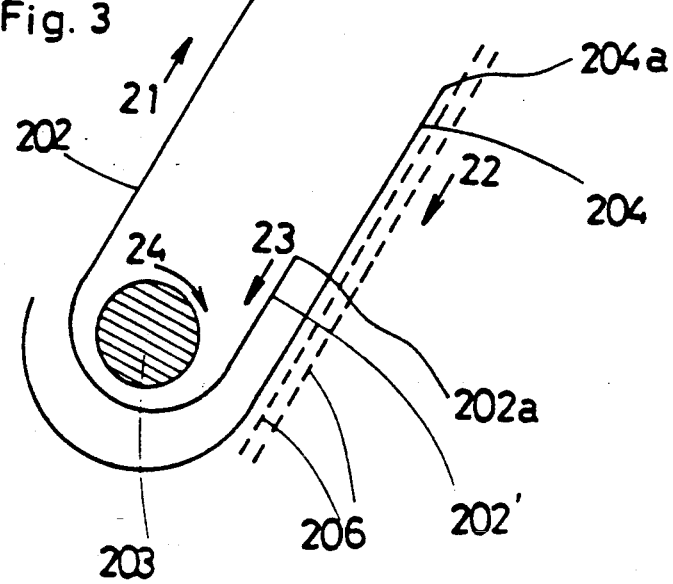
FIG. 3 is a schematic view showing a dislocating direction of the reinforcing components in bead section when a radial tire as shown in FIG. 2, is inflated.

In the structure of the bead section of the conventional tire shown in FIG. 2, the outermost end 204$a$ of the metal cord reinforcing layer 204 is higher than the outermost end 202$a$ of the turned up portion 202' of the carcass ply 202, and the bead failures have frequently occurred at the position where the outermost end 204$a$ is located.

The inventors studied the cause of the bead failure at the above mentioned position, and it is confirmed by many experiments that the outermost end 204$a$ of the metal cord reinforcing layer 204 functions like a resistant layer having a high bending rigidity, and the side wall deflection repeated every tire revolution transmits to the bead portion. As a result, the rubber at the cut ends of each metallic cords is broken down and caused to separate from the rubber.

Furthermore, the higher the position of the outermost end 204$a$ of the reinforcing layer 204, the earlier the separation between the cord end and the rubber occurs.

Then, the inventors have found that the above mentioned failure in the bead section is greatly decreased, by setting the height h2 of the outermost end 4$a$ of the first reinforcing layer 4 lower than the height h1 of the outermost end 2$a$ of the turned up portion 2' of the carcass ply 2 as shown in FIG. 4, namely, h2 is 0.7 to 0.9 times as high as the height h1.

When the height h2 is less than 0.7 h1, the rigidity of the bead section lowers, and the resistance to the bead section wear due to friction with the rim and to the casing failure under severe load also lowers.

On the contrary, when the height h2 is in the range of 0.9 h1 to 1.0 h1, both the outermost ends 2$a$ and 4$a$ are overlapped with each other, and the stress concentration is doubled thereon, so that problems are generated earlier than ever.

Therefore, the height h2 is preferred to be 0.7 to 0.9 times as high as the height h1.

From the stand point to prevent the cut end of the turned up portion 2' from the stress concentration and the carcass strength, the higher the height h3, the more preferable it is, however, when the height h3 is over 3.0 h1, such effect, as described above, become constant. Therefore, from the point of view of weight and cost reduction of tire, the maximum value of the height h3 was set up to be 3.0 h1.

On the contrary, if the height h3 is under 0.5 h1, which leads to the weight and cost reduction of the tire, the important effect is to prevent the above mentioned stress concentration, which is suddenly reduced, so the lower limit of height h3 is set up to be 0.5 h1.

Furthermore, the second reinforcing layer 6 has such another important functions excepting the above mentioned one as to prevent the outermost end 4b from stress concentration and to prevent effectively from defining a boundary area between the inward turned up portion 4' and the main portion of the carcass ply 2 thus preventing separation. Accordingly, it is important for the lowermost end 6b of the second reinforcing layer 6 to terminate at the position where the height from the bead base is h5, and also to interpose by a given width L with crossing with each other between the inward turned up portion 4' of the first reinforcing layer 4 and the main portion of the carcass ply 2.

Furthermore there is a more important factor, which is selection of the angle to arrange the second reinforcing layer 6. If the angle of cords arrangement between the first reinforcing layer 4 and the turned up portion 2' of the carcass ply 2 is set up to be in the range between 30° to 80° at right side upwards (viewing from the outerside of the axial direction of the tire, it is the same all below) at the position of about height h4, the cord angle of the inward turned up portion 4' in the axial direction incline at the left side upwards angle of 30° to 80°.

Thus, in order to let the second reinforcing layer 6 work effectively the above mentioned functions, it is an important feature of the present invention to arrange the ply cords of the second reinforcing layer 6 adjacent to the first reinforcing layer 4 crossing with each other at an angle of 30° to 80°, more preferable 40° to 70° with respect to the carcass ply cords in the right side upwards.

The second reinforcing layer 6 is composed of at least two layers of plies each consisting of cords arranged in parallel with each other in each ply and crosswise to next ply.

As previously described, by incorporating the carcass ply 2 and the second reinforcing layer 6 into a triangle structure, and further by adopting the fiber cords having a high modulus of initial elasticity of 700 to 15000 kgf/mm$^2$, more preferable 3000 to 15000 kgf/mm$^2$, the durability of the bead sections is greatly improved, which was confirmed through various fleet tests.

In addition, the height h4 of the inward turned up portion 4' of the first reinforcing layer 4 is in the range of 0.2 to 0.8 times as high as the height h3 of the outermost end 6a of the second reinforcing layer 6, in order to disperse the strain by keeping the overlap zone with the second reinforcing layer 6 in suitable range.

When the height h4 is under 0.2 h3, the width L of the overlap zone becomes narrow, and the dispersion of strain and the lateral stiffness become unsatisfactory.

On the other hand, when the height h4 is over 0.8 h3, it is not preferable that the outermost end 6b is located near the outermost end 4b, and the height h5 of the lowermost end 6b is set up to be under 40 mm from the bead base, this area is around the inside of the bead core 3, and the position where the dynamic strain is small and the movement is most stable and the stress concentration on the cut ends of cords is very small.

A circular rubber apex is disposed above the bead core 3 between the main portion and turned up portion 2' of the carcass ply 2, and has a substantially triangular cross sectional shape extending decreasingly outwardly with respect to the radial direction of the tire from the bead core 3. The apex is composed of two rubber stocks as shown in FIG. 4, one of which is the so-called stiffener 11 disposed adjacent to the bead core 3 and between the main portion and the turned up portion 2' of the carcass ply 2 and having a modulus of elasticity of 60 to 150 kgf/cm$^2$ at 100% elongation and a JIS (A) hardness of 70° to 90°, the other is the so-called buffer 12 disposed adjacent to the stiffener 11 and on the side of the turned up portion 2', and composed of a low elasticity rubber compound having a modulus of elasticity of 10 to 45 kgf/cm$^2$ at 100% elongation and JIS (A) hardness of 45° to 65° which is lower than that of the stiffness 11 and a coating rubber on the carcass ply 2.

On the other hand, the apex can be composed of a single soft rubber composition with a JIS (A) hardness of 45° to 65° and a modulus of elasticity of 10 to 45 kgf/cm$^2$ at 100% elongation, so as to lead to the below additional advantage in the improvement of durability in the bead section, as discussed below.

That is, according to the invention, the deformation of the bead section can be greatly restrained by arranging the second reinforcing layer 6 and the first reinforcing layer 4 to reinforce the inner side of the carcass ply main portion.

Therefore, there is less need to adopt the hard rubber compound, which highly induces an internal temperature raise, for the bead apex, as the prior art, to hold the high rigidity and to restrain the deformation of the bead section which has a close relation with resistance to wear of the bead section due to friction with a rim flange.

The deformation in the radial and circumferential direction can be effectively prevented, and the stress and strain can be broadly dispersed to recover the original state, so it becomes possible to use the soft rubber stock having a low heat generation for a triangular apex in a single rubber layer.

It is natural that a hard rubber apex can be applied to the reinforcing structure at the bead section of the tire of the present invention.

Especially, in the case of a tubeless tire with 15° tapered bead seat, it was confirmed through various investigations by the inventors that the tire with a soft rubber apex of a single layer can be more effectively practiced for rim matching by the inner pressure and rim fitting work.

As described above, it is an important feature of the present invention to arrange the second reinforcing layer 6 composed of fiber cord having a relatively high modulus of initial elasticity, along the inside of the main portion of the carcass 2 in the axial direction of the tire and crossing with each other at an angle of 30° to 80° with respect to the carcass ply cords to form an triangular structure, and to form the bead structure having high rigidity by interposing the inward portion of the second reinforcing layer 6 between the carcass main portion and the inward turned up portion 4' of the first reinforcing layer 4 with a given width L with crossing each other.

By adopting the above mentioned structure, the durability of the bead sections is greatly improved, because the dispersion of the stress which is transmitted by the carcass ply through bead cores to the wheel flange is distributed to a large area during every tire revolution; and the expansion of the cord spaces in carcass ply is restrained; and heat generation is controlled in a low level.

Besides, the coating rubber of the carcass ply cords, and of the first and second reinforcing layer must have an excellent adhesive force and an excellent resistance to boundary fatigue in the state of both static and dynamic conditions.

The soft rubber stock having modulus of elasticity of 10 to 45 kgf/cm² at 100% elongation is used as the apex composed of one piece buffer, or as the buffer of the combination apex composed of the soft rubber buffer and a hard rubber stiffener, therefore, the internal temperature raise in the bead sections is restrained to the lower level than that in a conventional tire.

Thus, the durability of the bead section can be considerably improved so as to provide such a reliable and high security tire with the ability to be recapped two or three times.

The effect of the invention will be described with reference to the comparison test of the tires having the above described reinforcing bead structure, as shown in Table 1 and FIG. 4, with the conventional tire having the same construction except for the bead structure as shown in Table 2 and FIG. 2, according to Japanese patent publication No. 52-11481, on tire size of 10.00R20 14PR and 12R22.5 14PR.

Figure 5A:
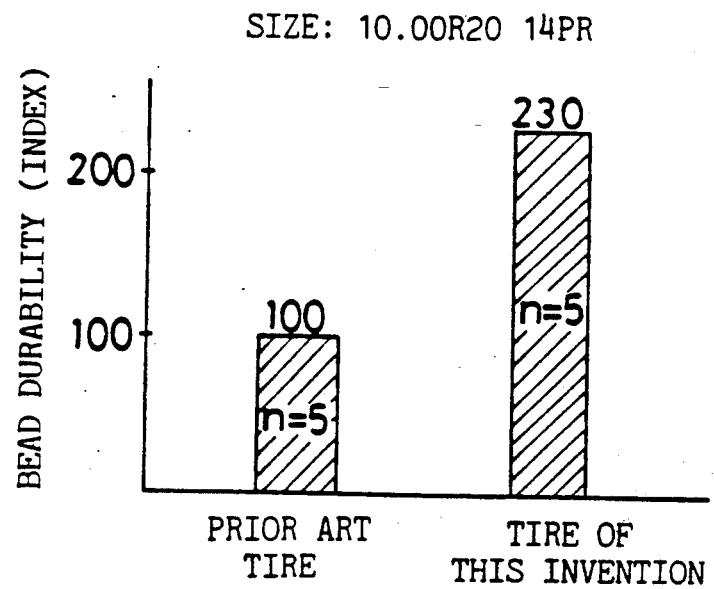
FIGS. 5($a$) and 5($b$) are diagrammatic views showing the results of a durability test by a steel drum tester.
Figure 5B:
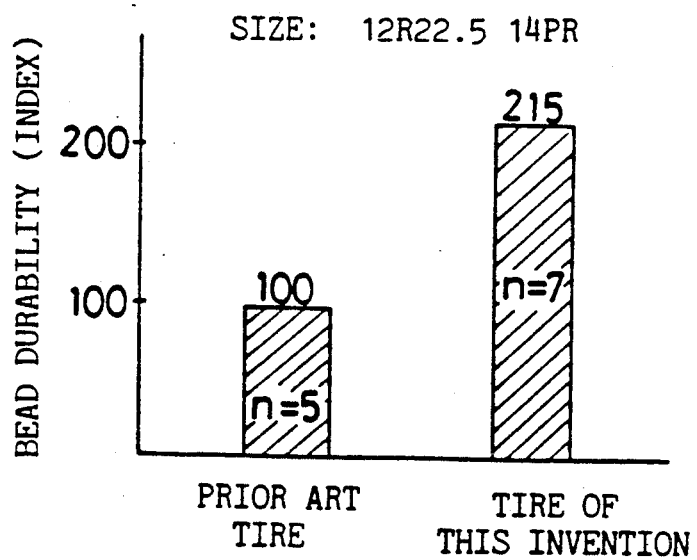

In this test, test tires run on a steel drum under constant work Q (load x speed) kg.km/h and normal internal pressure. The bead durability (running times until the bead portion is damaged) is measured. The results are shown in FIG. 5, wherein the performance is expressed by the index based on the conventional tire of FIG. 2 as 100.

The results of the drum durability test confirmed that the tire according to the present invention has an excellent durability in the bead section.

In addition, the fleet test under various service conditions were carried out in comparison with conventional one, and the results of this fleet test showed that the tire according to the present invention has none of the previously discussed problems even under severe service conditions, and has an excellent durability in the bead section.

Besides, it was also confirmed by these test that the tire in size of 12R22.5 according to the present invention is better than the conventional tire in respect of ease in setting the rim on the tire and of rim matching with 15° taper rim.

What is claimed is:

1. A radial tire for heavy duty use, comprising:
a pair of circular bead cores provided in bead parts of the tire;
elastomer surrounding the bead cores to define a tire body with a bead base line radially inwardly of the bead cores;
a carcass ply of substantially radially arranged metallic cords, both ends of which are turned up around the bead cores from the axially inside to outside of the tire to form carcass ply turned up portions each axially outside of the bead core and a carcass ply main portion axially inside of the bead core;
a first reinforcing member comprising a ply of metallic cords,
said first reinforcing member disposed adjacent to and axially outside of the carcass ply turned up portion so as to place the radially outermost end thereof radially inside the radially outermost end of the carcass ply turned up portion,
said first reinforcing member turned up around the bead core from the axially outside to inside of the tire to form a turned up portion axially inside of the bead core,
the arrangement angle of said metallic cords of the first reinforcing member at the height h4 of the radially outermost end of the turned up portion thereof being in a range of 30 to 80 degrees with respect to the substantially radially arranged metallic cords of the carcass ply turned up portion;
a second reinforcing member comprising organic fiber cords,
said second reinforcing member, disposed along and axially inside the carcass ply main portion, and extending radially inwardly to be interposed between the turned up portion of the first reinforcing member and the carcass ply main portion, and terminating axially inside the bead core at a perpendicular height (h5) above the bead base line of the tire of not more than 40 mm,
said second reinforcing member comprising two plies of said organic fiber cords, and the cords of each ply arranged in parallel with each other but crosswise to the cords of the other ply,
the arrangement angle of said organic fiber cords of the second reinforcing member at the height h1 of the radially outermost end of the carcass ply turned up portion being in a range of 30 to 80 degrees with respect to the substantially radially arranged metallic cords of the carcass ply main portion so as to form a triangular structure.

2. A radial tire for heavy duty as set forth in claim 1, wherein a perpendicular height (h1) of the carcass ply turned up portion above the bead base line is 0.3 to 0.5 times a perpendicular height (h6) above the bead base line at which the section width of the tire inflated to a normal pressure becomes maximum.

3. A radial tire for heavy duty as set forth in claim 2, wherein a perpendicular height (h2) of the radially outermost end of the first reinforcing member from the bead base line is 0.7 to 0.9 times the height (h1) of the carcass ply turned up portion.

4. A radial tire for heavy duty as set forth in claim 2, wherein a perpendicular height (h3) of the radially outermost end of the second reinforcing member from the bead base line is 0.5 to 3.0 times the height (h1) of the carcass ply turned up portion.

5. A radial tire for heavy duty as set forth in claim 4, wherein a perpendicular height (h4) of the radially outermost end of the turned up portion of the first reinforcing member from the bead base line is 0.2 to 0.8 times the height (h3) of the radially outermost end of the second reinforcing member.

6. A radial tire for heavy duty as set forth in claim 1, wherein the cords of the second reinforcing member have a modulus of initial elasticity of 700 to 15000 kgf/mm².

7. A radial tire for heavy duty as set forth in claim 1, wherein the tire beads include bead apexes each disposed between the carcass ply main portion and the carcass ply turned up portion, end bead apex is composed of a hard rubber stock disposed adjacent the bead core and a soft rubber stock disposed radially outside the hard rubber stock, said hard rubber stock is composed of a high elasticity rubber compound with a modulus of elasticity of 60 to 150 kgf/cm² at 100% elongation and JIS (A) hardness of 70° to 90°, said soft rubber stock is composed of a low elasticity rubber compound with a modulus of elasticity of 10 to 45 kgf/cm² at 100% elongation and JIS (A) hardness of 45° to 65° which is lower than that of a carcass ply coating rubber.

8. A radial tire for heavy duty as set forth in claim 1, wherein the tire beads include bead apexes each disposed between the carcass ply main portion and the carcass ply turned up portion, each bead apex is composed of a soft rubber stock, said soft rubber stock is composed of a low elasticity rubber compound with a modulus of elasticity of 10 to 45 kgf/cm² at 100% elongation and JIS (A) hardness of 45° to 65° which is lower than that of a carcass ply coating rubber.

* * * * *